US012022243B2

(12) United States Patent
Popp

(10) Patent No.: US 12,022,243 B2
(45) Date of Patent: Jun. 25, 2024

(54) BACKGROUND DISPLAY DEVICE

(71) Applicant: Arnold & Richter Cine Technik GmbH & Co. Betriebs KG, Munich (DE)

(72) Inventor: Hermann Popp, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 0 days.

(21) Appl. No.: 17/963,342

(22) Filed: Oct. 11, 2022

(65) Prior Publication Data

US 2023/0110184 A1 Apr. 13, 2023

(30) Foreign Application Priority Data

Oct. 11, 2021 (DE) .......................... 102021126312.3

(51) Int. Cl.
*H04N 5/222* (2006.01)
*H04N 9/31* (2006.01)
*G09F 9/33* (2006.01)

(52) U.S. Cl.
CPC ......... *H04N 9/3188* (2013.01); *H04N 5/2224* (2013.01); *H04N 9/3155* (2013.01); *H04N 9/3185* (2013.01); *H04N 9/3194* (2013.01); *G09F 9/33* (2013.01); *G09G 2300/026* (2013.01)

(58) Field of Classification Search
CPC ........ H04N 23/90; H04N 5/02; G06F 3/1446; G09G 2300/026
See application file for complete search history.

(56) References Cited

U.S. PATENT DOCUMENTS

| 9,256,391 | B2* | 2/2016 | Sunkara | G06F 3/1438 |
| 9,710,972 | B2* | 7/2017 | Sanders | H04N 5/275 |
| 9,787,937 | B1* | 10/2017 | Hung | H04N 7/0122 |
| 9,942,622 | B2* | 4/2018 | Zhang | H04N 21/8547 |
| 2016/0323838 | A1* | 11/2016 | Hsu | H04W 56/002 |
| 2016/0357493 | A1 | 12/2016 | Zerwas | |
| 2019/0132398 | A1* | 5/2019 | Patterson | H04L 67/141 |
| 2020/0145644 | A1* | 5/2020 | Cordes | H04N 23/698 |
| 2022/0353387 | A1* | 11/2022 | Kallio | H04N 1/6052 |
| 2023/0109907 | A1* | 4/2023 | Popp | H04N 5/2224 |
| | | | | 348/800 |

OTHER PUBLICATIONS

European Patent Office Communication issued in Application No. 22200062.2, dated Feb. 23, 2023.

* cited by examiner

*Primary Examiner* — Sepehr Azari
(74) *Attorney, Agent, or Firm* — Amster, Rothstein & Ebenstein LLP

(57) ABSTRACT

A background display device for a virtual image recording studio for displaying a representation of a virtual background behind a real subject comprises a control device that comprises a single first control unit and least one second control unit. The first control unit is configured to generate the virtual background, to determine a projection of the virtual background onto the active illumination apparatus, and to transmit at least one section of the determined projection to the at least one second control unit. The at least one second control unit is configured to control the active illumination apparatus to display the at least one section of the determined projection of the virtual background.

19 Claims, 7 Drawing Sheets

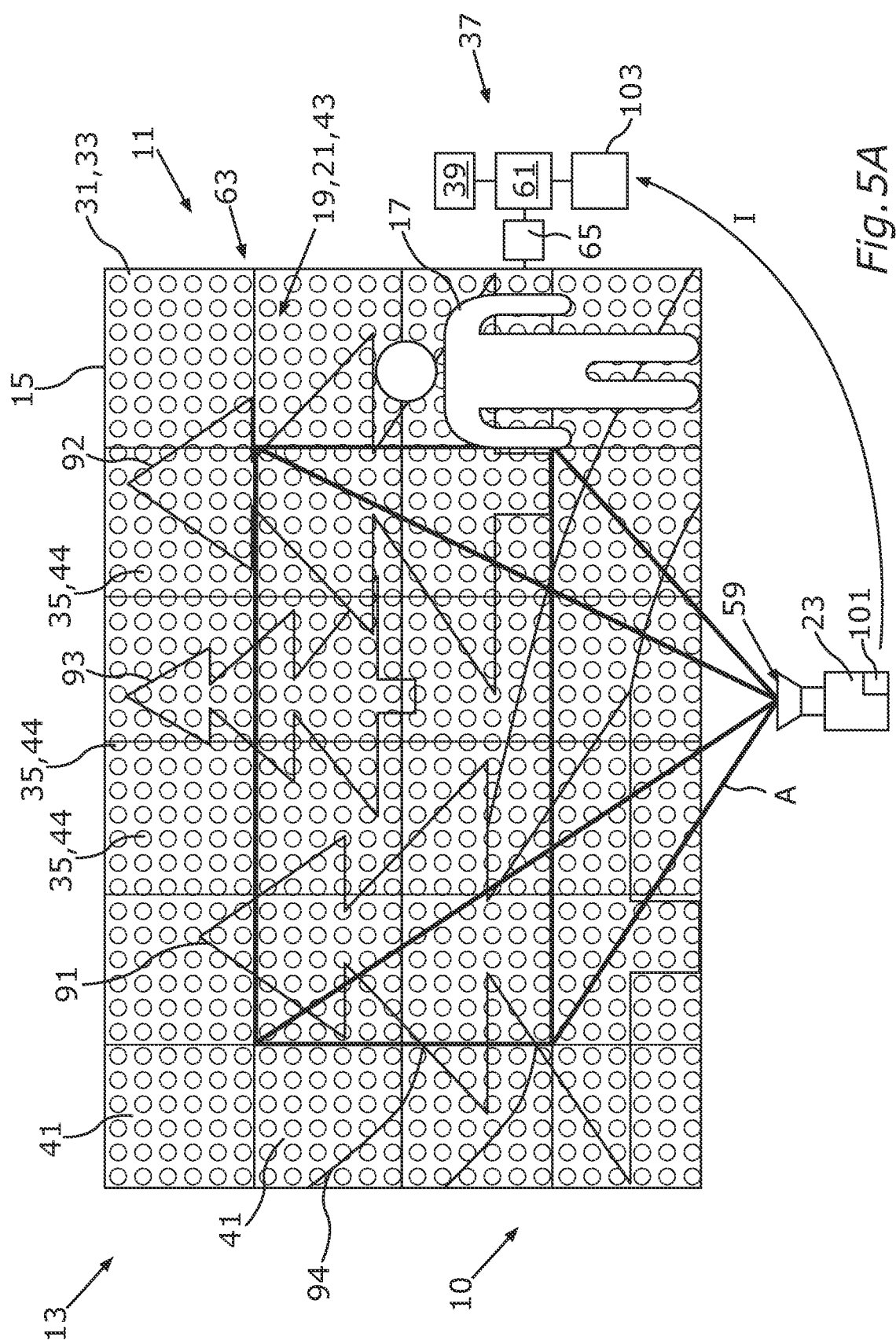

BACKGROUND DISPLAY DEVICE

BACKGROUND DISPLAY DEVICE

Figure 1:
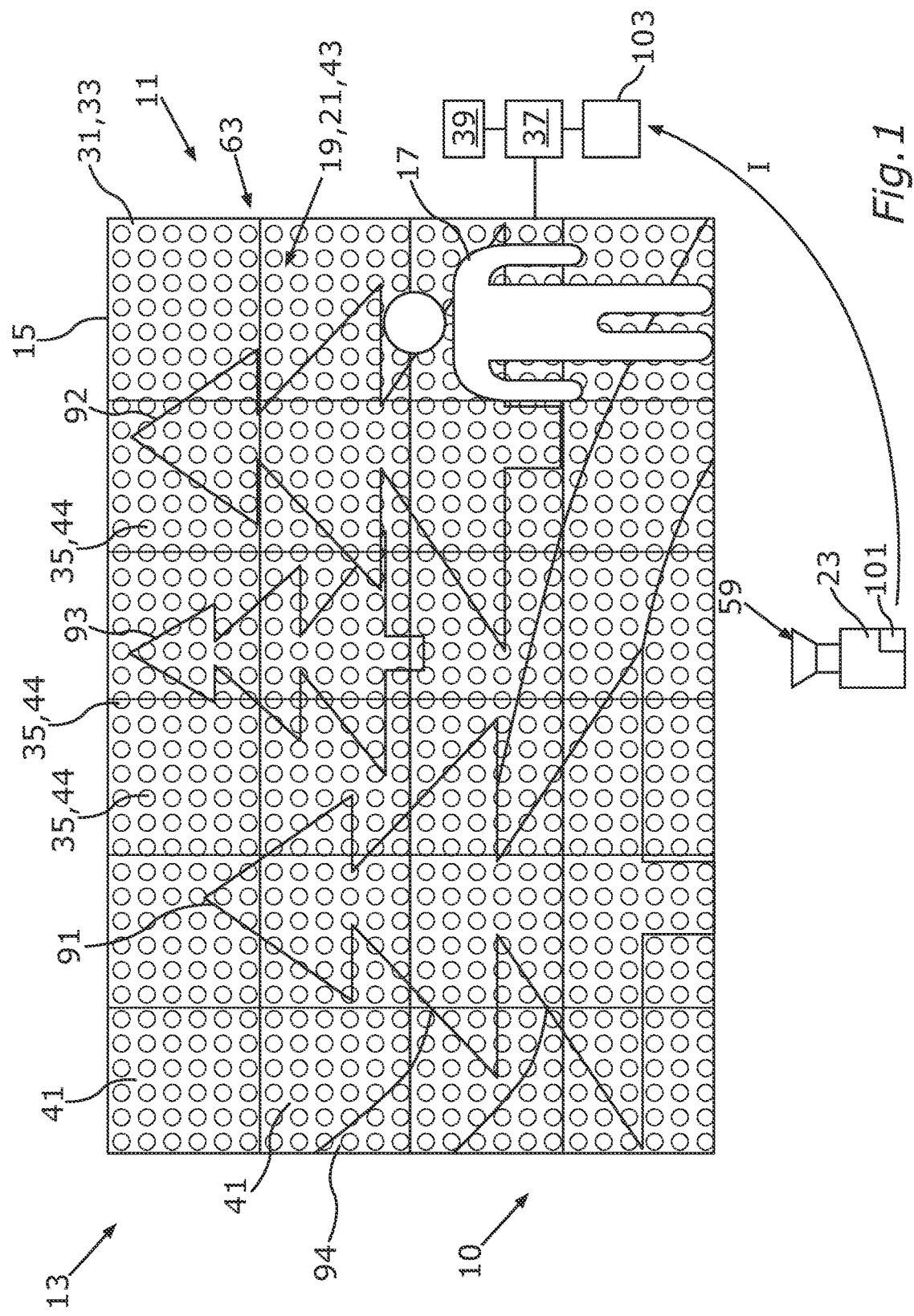

The invention relates to a background display device for a virtual image recording studio that is configured to display, behind a real subject, a representation of a virtual background for a recording by an associated camera.

Such background display devices can in particular be provided to display in an image recording studio a landscape or an environment in which a recording is to be made by an associated camera and which forms a virtual background for a scene to be recorded. The image recording studio, for example, can be a film studio for recording moving image sequences or a photo studio in which individual images or still images are recorded. In general, such a recording can include local storage of image data or a transmission to a remote location (e.g. Broadcast, Streaming). In the virtual image recording studio, a virtual background or a virtual environment can thus be created in which an actor can move around during a moving image recording, or it can form a background for a still image recording. The virtual background mentioned in the present context therefore comprises image information that represents a background subject and that can be directly recorded by an associated camera as an apparently real environment of a (foreground) scene. The representation of the virtual background "behind" a real subject is to be understood comprehensively in this context since the virtual environment can also be provided above or below the real subject.

For example, when recording moving images, a background display device can be used to display a representation of a virtual background to be able to record a scene directly in the intended environment. In particular, as a result of this, the acting can be facilitated since possible events occurring in the virtual background can be perceived by an actor and the actor can react to these events. In contrast to the use of a green screen for example where the environment is not visible to the actor, the actor can therefore adapt his acting to any background events and a director, a camera person or any other person involved in a shooting can already gain an overall impression of the scene during the shooting and can evaluate the scene. In addition, the entire scene or a corresponding section of a film can be viewed and checked directly after the recording, without the background provided for the scene also having to be superposed.

In the case of still image recordings, such a background display device can, for example, be used to record photographs in basically any surrounding in an image recording studio, and thus in a controllable environment, and to have the resulting image fully in view while taking the photograph. The background and the real subject or a person to be photographed can thus be optimally matched or coordinated with one another. In addition, the recorded photo can be viewed immediately, in order to carry out necessary adjustments if required.

To display the representation of the virtual background, background display devices can in particular form or have an electronic display, which has an active pixel matrix, and can, for example, comprise an active illumination apparatus having a plurality of light-emitting elements. For example, to display a representation of a virtual background in a virtual image recording studio, an LED wall can be used whose light-emitting diodes can be controllable individually and/or in groups of adjacent light-emitting diodes or in arrays of light-emitting diodes. Light-emitting diodes of such an LED wall can, for example, be provided as LEDs (Light Emitting Diodes) or as OLEDs (Organic Light Emitting Diodes). Furthermore, the light-emitting diodes can be part of a liquid crystal display. Such background display devices can, for example, extend over a width of at least 5 m and a height of at least 2 m to be able to record several actors in front of a common (virtual) background.

Furthermore, background display devices can comprise a plurality of panels at which the picture elements are arranged and which together form the LED wall.

While the panels can be substantially two-dimensional and the picture elements arranged at a panel can extend in a two-dimensional arrangement, it can, for example, be achieved by a suitable arrangement of a plurality of panels that the background display device is sectionally curved and/or arched. The background display device can thereby be arranged, for example, both behind and above or below the real subject in the virtual image recording studio in order also to enable the direct recording of a representation of a virtual sky, or of a virtual ceiling of a room, or of a virtual floor in the image recording studio. Alternatively to an LED wall, a representation of a virtual background can generally also be generated by light spots that are produced by a reflection or a transmission at a light source wall, for example, a screen for a rear projection. For this purpose, the active light generation can take place by a projector, wherein the light sources are merely formed indirectly on the screen.

Such a background display device can in particular make it possible to visually present a virtual background by appropriately controlling the picture elements and/or to adapt said virtual background by changing the control during a recording. The virtual background mentioned in the present context can in particular represent a background subject whose representation can be directly recorded by an associated camera as an apparently real environment of a (foreground) scene.

A background display device thus offers the possibility of representing a virtual background for a scene to be recorded in an animated and easily adaptable manner and thereby, in particular, of facilitating the acting or the gestures.

To be able to display a representation of a virtual background, which can in particular represent a three-dimensional scene, on such a background display device, provision is usually made that the virtual background is generated by a so-called 3D computer that can create the virtual background based on a three-dimensional model, for example. Alternatively thereto, a virtual background can, for example, also be read in at an interface, for instance, a DVD player.

The generated or read-in virtual background can then be transmitted from the 3D computer and/or the interface to a central control of the background display device that can prepare the virtual background for the display on the background display device. Such a central control of the background display device can in particular image or project the received virtual background onto the background display device and can thereby generate a representation of the virtual background that can be displayed on the background display device. The central control can further be configured to divide the virtual background into different sections that can be displayed at different locations of the background display device. After the preparation of the virtual background, the central control device can transmit the determined projection of the virtual background or sections of the projection to further control devices that can, for example, be configured to control individual picture elements, in particular light-emitting diodes, of the background display device to display a respective section of the representation of the virtual background.

However, such a control of the background display device, which comprises a plurality of individual control devices that perform respective functions, is relatively complicated and unclear. For example, the data that are generated by the 3D computer and that represent the virtual background first have to be transmitted to the central control of the background display device, for which purpose the data in particular have to be encoded. The encoded data have to be received and decoded at the central control to be able to determine the projection onto the background display device and to prepare the data for a display on the background display device. The determined projection or corresponding image data then have to be encoded and forwarded again to be able to display the representation of the virtual background. This large number of required data transmissions from the generation of the virtual background up to the display on the background display device in particular requires high data transmission rates and a high computing power for the respective encoding and decoding of the data, whereby the control of the background display device can be made more difficult and can be slowed down. Furthermore, the exact manner of the processing of the data during such a control and transmission can often only be reproduced with difficulty so that any errors occurring during the display of the representation can often only be traced, and correspondingly corrected by adapting the control, with great effort.

It is therefore an object of the invention to provide a background display device having a simplified and faster control.

This object is satisfied by a background display device having the features of claim 1.

The background display device has an active illumination apparatus that has one panel or a plurality of panels, wherein the panel, or the plurality of panels together, has or have a plurality of picture elements in an at least two-dimensional arrangement. The background display device has a control device, wherein the control device comprises a single first control unit and least one second control unit. The first control unit is configured to generate the virtual background, to determine a projection of the virtual background onto the active illumination apparatus, and to transmit at least one section of the determined projection to the at least one second control unit. The at least one second control unit is configured to control the active illumination apparatus to display the at least one section of the determined projection of the virtual background.

In this background display device, provision is thus made that a single first control unit fulfills both the function of a 3D computer of a conventional background display device—to generate the virtual background—and the functions of the conventionally provided central control, namely to prepare the virtual background for a display on the background display device. Provision can in particular be made to generate the virtual background directly in the central control of the background display device that can be formed by the first control unit in this regard.

The single first control unit can in particular form a closed unit. For example, the first control unit can be formed by a single hardware component or can comprise a plurality of hardware components housed in a single common housing, for example, a housing of a computer. The first control unit can thus in particular exclusively comprise hardware components that are surrounded by a single common housing without there being any exposed, unenclosed connections between the components of the single first control unit.

The single first control unit can, for example, be formed by a microprocessor or comprise a plurality of microprocessors, wherein the individual functions and/or process steps that are performed by the first control unit can, for example, be divided among different microprocessors. However, in a configuration with a plurality of microprocessors, said microprocessors can be housed in a single common housing.

In other embodiments, however, the first control unit can—at least partly—be formed in an external data center (physically or, for example, as a virtual machine).

The respective second control unit can, for example, comprise a microcontroller that can in particular form a panel control or a panel controller. The respective second control unit is formed separately from the first control unit, i.e. as a separate physical unit. The respective second control unit can be arranged spatially remote from the first control unit. If the background display device has a plurality of panels, a corresponding number of second control units can be provided that are associated with a respective one of the plurality of panels, as will be explained further below. If the background display device has a plurality of second control units, the second control units can in particular be arranged at or in spatial proximity to a respective panel.

To determine a projection of the virtual background onto the active illumination apparatus, the first control unit can in particular be configured to determine image data that represent the projection. The generated virtual background can in particular be a three-dimensional virtual background that, however, has to be projected onto the active illumination apparatus and the arrangement, for example two-dimensional arrangement, of the plurality of picture elements to enable a display of a representation of the virtual background on the background display device. The active illumination apparatus can be configured to display the image data determined by the first control unit and transmitted to the at least one second control unit as a result of a control by the second control unit so that the spatial resolution of the representation of the virtual background can in particular correspond to the arrangement of the picture elements at the background display device. In this regard, the projection of the virtual background onto the active illumination apparatus can comprise generating respective image information for the picture elements of the active illumination apparatus that can, for example, define a brightness and/or a color value of a respective picture element. To display the respective image information, the picture elements can in particular be actively illuminating manner and/or can be controllable individually or in groups of picture elements by the second control unit.

Furthermore, in order to transmit at least a section of the determined projection, the first control unit can be configured to transmit at least a portion of the image data that represent the projection to the at least one second control unit. In general, the background display device can, for example, have only a single panel that is, for example, large relative to an actor, wherein the background display device can, however, also comprise a plurality of assembled panels. The at least one section which the first control unit transmits to the second control unit can therefore correspond to the total projection of the virtual background onto the active illumination apparatus to be able to display this section or the projection at a single panel. However, the at least one section can also only correspond to a part of the projection that is displayed at a panel associated with the second control unit.

Since a single first control unit is thus provided that both generates the virtual background and determines the projection of the virtual background onto the active illumination apparatus, the control of the background display device can be simplified and the data processing from the generation of the virtual background up to the final display of the representation of the virtual background can be made traceable and verifiable. Furthermore, transmission paths for transmitting the data representing the virtual background can be minimized in that the data do not, as is the case with conventional background display devices, first have to be generated, then, for example, have to be compiled or encoded into a common data set and transmitted to the central control of the background display device in order first to have to be received and decoded by the central control before the determination of the projection onto the active illumination apparatus can start at all. Furthermore, it can be necessary for conventional controls of background display devices that the virtual background generated by the 3D computer has to be compressed before a transmission to the central control in order to enable the transmission. Accordingly, an additional computational effort can arise at the central control to decompress the data representing the virtual background again. Due to the concentration of the functions of generating the virtual background and determining the projection and/or preparing the virtual background for a display on the background display device in the single first control unit, such complex data transmissions can, in contrast, be avoided so that the control of the background display device can take place more efficiently and faster overall.

Further embodiments can be seen from the dependent claims, from the description and from the drawings.

In some embodiments, the active background display device can be configured as an LED wall that has a plurality of light-emitting diodes that form the picture elements.

In some embodiments, the background display device can be configured as an LED wall and the picture elements can be configured as light-emitting diodes or light-emitting diode units. The light-emitting diodes of such an LED wall can, for example, be configured as LEDs (Light Emitting Diodes) or as organic light-emitting diodes or OLEDs (Organic Light Emitting Diodes). Furthermore, in the case of an LED wall, provision can be made that the individual picture elements, which together generate the representation of the virtual background, are formed by individual light-emitting diodes. However, the individual picture elements can also be formed by respective light-emitting diode units, wherein each light-emitting diode unit can in particular comprise a plurality of light-emitting diodes, in particular three light-emitting diodes. For example, a light-emitting diode unit can also comprise three, four or more light-emitting diodes, wherein the plurality of light-emitting diodes of a light-emitting diode unit can in particular have different emission spectra and can optionally be equipped with a color mixer. Furthermore, in such a light-emitting diode unit, provision can be made that the individual light-emitting diodes of the light-emitting diode unit can be selectively controlled to produce a desired color of the picture element formed by the light-emitting diode unit. A light-emitting diode unit can in particular comprise a light-emitting diode emitting red light, a light-emitting diode emitting green light, and a light-emitting diode emitting blue light.

In some embodiments, provision can further be made that the picture elements can be individually controlled to generate the representation of the virtual background. By controlling the picture elements, a respective color and/or brightness of the picture element can in particular be settable to be able to set a section or a point of the representation of the virtual background that is displayed by the respective picture element to the intended color and/or brightness.

In some embodiments, the background display device can extend in a vertical and/or horizontal orientation, in particular with continuous or quasi-continuous transitions. For example, provision can be made that the background display device extends in a vertical orientation in a planar manner behind the real subject to display the representation of the virtual background behind the real subject. Alternatively or additionally, provision can, however, also be made that the background display device at least sectionally extends in a horizontal orientation so that the representation of the virtual background can also be displayed above the real subject, for example. Furthermore, the background display device can be configured to surround and to cover the real subject in order to enable as complete as possible a display of the virtual background over a large angular range. In a section in which the background display device transitions from a vertical orientation into a horizontal orientation, the background display device can also be arched and/or curved. In particular in an assembly of the background display device from a plurality of panels, the panels can be assembled to form different and, for example, vault-like geometries in order to provide a desired environment for a recording in the virtual image recording studio. Furthermore, in some embodiments, provision can be made that the background display device is sectionally arranged on a floor of the virtual image recording studio. In such sections, the background display device can also in particular extend in a horizontal orientation.

In some embodiments, the background display device can further be configured to illuminate the real subject. This background display device can in particular serve to illuminate the real subject in addition to other illumination of the virtual image recording studio. For example, it can thereby be achieved that the real subject casts a shadow to be expected when illumination sources, for example a street lamp, are included in the virtual background in that the illumination of the real subject to be expected from a real street lamp starts from the displayed representation of the street lamp of the virtual background. However, the background display device can also be configured to sectionally emit light for illuminating a scene and can so-to-say act as a spotlight, while the background display device can display the representation of the virtual background at other sections.

In some embodiments, the background display device can be configured to vary the representation of the virtual background in time during the recording. Events taking place in the virtual background can thereby in particular be displayed directly by the background display device during a camera recording so that, unlike, for example, in the case of a green screen recording, an actor can react to these events and can correspondingly adapt the acting thereto. Consequently, the background display device can in particular be configured to display a film sequence, which can be recorded directly by the camera, during the camera recording. A subsequent superposition of the recording of the camera with a provided background is thus no longer necessary.

In some embodiments, the first control unit can be configured to scale the virtual background to the active illumination apparatus.

For example, the virtual background generated by the first control unit can comprise positions and/or sizes of objects of a real background corresponding to the virtual background, for instance of objects of a landscape represented by the virtual background. Such a three-dimensional landscape accordingly has to be projected onto the active illumination apparatus and, for example, a two-dimensional arrangement of the picture elements, on the one hand. On the other hand, a scaling to the background display device that is smaller compared to the sizes of objects in the virtual background and/or to the at least one panel can additionally be required. In this regard, the first control unit can, for example, be configured to first project the generated virtual background, in particular a three-dimensional virtual background, onto the arrangement of the picture elements of the active illumination apparatus in order then to scale the determined projection to the dimensions of the background display device and/or of the active illumination apparatus. Thereupon, the first control unit can be configured to generate respective image information for the picture elements and/or respective sections of the representation of the virtual background on the basis of the scaled projection of the virtual background in order to transmit the image data processed in this manner to the second control unit.

Provision can furthermore be made that the first control unit is configured to map the determined projection onto a spatial resolution of the picture elements of the active illumination apparatus in order to generate respective image information for the individual picture elements and/or groups of picture elements. The first control unit can also be configured to consider, for example, different spatial resolutions of the arrangement of the picture elements so that the first control unit can be compatible with different panels and/or active illumination apparatus.

In some embodiments, the at least one second control unit can be configured to transmit information about a geometry and/or an arrangement of the panel or of the plurality of panels of the background display device to the first control unit. Furthermore, the first control unit can be configured to adapt the at least one section of the determined projection of the virtual background in dependence on the information.

For example, the at least one second control unit can be configured to transmit information about dimensions of the at least one panel, about a position of the at least one panel in space and/or an orientation of the at least one panel, for example an inclination of the at least one panel with respect to the vertical, to the first control unit. The first control unit can be configured to consider the transmitted information in order, for example, to scale the determined projection of the virtual background to the dimensions of the at least one panel. Furthermore, the first control unit can be configured to consider an inclination of the at least one panel when determining the projection. An arrangement and/or a number of the picture elements of the panel or of the plurality of panels can also be transmittable from the at least one second control unit to the first control unit as information about a geometry of the at least one panel so that the first control unit can in particular consider a resolution of the at least one panel when determining the projection and/or when scaling the virtual background.

Furthermore, in particular in embodiments of the background display device in which the active illumination apparatus comprises a plurality of panels, the first control unit can be configured to determine the respective sections to be displayed at the individual panels in dependence on an arrangement of the panels and to transmit them to the at least one second control unit and/or respective second control units associated with the panels. Embodiments of the background display device with a plurality of panels are also explained in more detail below. Due to a transmission of information about the arrangement in particular of such a plurality of panels, it can, for example, be achieved that an upper section in the determined projection is also displayed at a panel arranged at the top, whereas a lower section adjoining below the upper section in the projection can be displayed at a lower panel positioned below the panel arranged at the top. Due to such an information transmission, it can in particular be achieved that the first control unit can be flexibly used in combination with different active illumination apparatus in that information about a changing arrangement and/or number of panels of the active illumination apparatus can be transmitted from the at least one second control unit to the first control unit and can be considered by the latter when determining the at least one section.

To enable a transmission of information from the at least one second control unit to the first control unit, the at least one second control unit can in particular be linked in a network to the first control unit. A plurality of second control units that are associated with respective panels of the active illumination apparatus can in particular be linked to the first control unit via a network in order, for instance, to be able to transmit information about the arrangement and/or orientation and/or geometry of the plurality of panels and/or a number of panels of the active illumination apparatus to the first control unit. The communication within such a network can take place in accordance with a data bus protocol.

As already explained, via such a link to a network, the first control unit can be flexibly used to control different and/or adaptable active illumination apparatus in that a respective current number and/or arrangement of the panels of the respective active illumination apparatus can be considered by the first control unit.

An adaptation of the active illumination apparatus can, for example, comprise adding or removing panels. The first control unit can be configured to automatically recognize the presence of a respective second control unit in the network, for example, based on a respective IP address. A configuration of the control device of the background display device can hereby be simplified, namely by an automatic recognition of an associated second control unit (with which a respective panel is associated) due to a connection of the second control unit to the network.

Furthermore, it is also possible to arrange the first control unit—at least partly—in an external data center to be able to access the capacities of such a data center, but to link the first control unit to the at least one second control unit via a network connection. Such a link can first enable the transmission of the at least one section of the projection from an externally arranged first control unit to the at least one second control unit that can be arranged in the virtual image recording studio. If necessary, the aforementioned information can furthermore be transmitted from the at least one second control unit to an externally arranged first control unit so that the external control unit can flexibly determine the projection and/or the at least one section in dependence on the specific design of the active illumination apparatus. The concentration of the functions of generating the virtual background and determining the projection onto the active illumination apparatus into a single first control unit thus in particular also enables cloud-based solutions in which external capacities can be drawn on to perform these computationally intensive functions. Due to a transmission of information with respect to the arrangement and/or geometry of the at least one panel, in particular a plurality of panels, of the active illumination apparatus, a first control unit arranged in an external data center can furthermore be used to control active illumination apparatus of basically any design.

Furthermore, in some embodiments, the first control unit can be configured to map the virtual background onto a color space of the active illumination apparatus. For example, the active illumination apparatus can comprise a plurality of light-emitting diodes that are grouped into respective groups of light-emitting diodes. Each of these groups can in particular comprise a light-emitting diode emitting green light, a light-emitting diode emitting red light and a light-emitting diode emitting blue light so that light can be emitted in a specific color space by the group of light-emitting diodes by an appropriate control of the light-emitting diodes and/or of a color mixer of the respective group of light-emitting diodes. Therefore, the first control unit can, for example, be configured to map colors included in the virtual background onto such a color space that can be generated by the picture elements to be able to generate corresponding image information for the picture elements. The first control unit can again in particular be configured to first determine a projection of the virtual background onto the active illumination apparatus in order then to image the projection onto a color space of the active illumination apparatus of the background display device. The at least one second control unit can also be configured to transmit information about a color space of the active illumination apparatus to the first control unit.

In some embodiments, the first control unit can be configured to communicate with the at least one second control unit via an Ethernet connection.

Such an Ethernet connection can in particular make it possible to transmit basically any file formats at basically any data rates from the first control unit to the at least one second control unit. Furthermore, time information, which can, for example, be generated on the basis of PTP (Position Time Protocol), can, for example, also be transmitted via an Ethernet connection in addition to the data that represent the projection of the virtual background. This can in particular be provided in case the background display device comprises a plurality of panels and a respective section of the representation of the virtual background is to be displayed and/or changed at the panels at the same time. For example, provision can be made that the background display device is configured to change the displayed representation of the virtual background in time so that, through a transmission of a time stamp or of time information in addition to the respective section to be displayed at one of the plurality of panels, it can be achieved that all the panels update the respective section of the representation of the virtual background at the same time. Furthermore, data, for instance status information or position information of the panel, can also be transmitted from the second control unit to the first control unit via an Ethernet connection, which data the first control unit can consider when generating the virtual background and/or when determining the projection onto the active illumination apparatus of the background display device.

Furthermore, Ethernet is usually integrated into standardized systems so that, for example, the first control unit can also be relocated to external data centers to be able to use corresponding computing capacities that cannot be easily made available in the virtual image recording studio, for example. Based on the current possibilities for signal transmission, such an external arrangement of the first control unit can be made possible on a communication via an Ethernet connection without the control of the background display device being slowed down beyond an acceptable level. Furthermore, as explained in more detail below, provision can be made to transmit individual sections of the representation of the virtual background only in compressed form from the first control unit to the at least one second control unit, whereby any latencies can be even further reduced.

In some embodiments, the background display device can have an interface for receiving information about an imaging window of the associated camera, wherein the first control unit can be configured to determine the at least one section of the determined projection and to transmit said at least one section of the determined projection to the at least one second control unit in dependence on the information about the imaging window of the camera.

Such an imaging window of the camera can in particular also be referred to as a frustum or viewing pyramid of the associated camera and can in particular determine which part of the background display device and/or of the active illumination apparatus is captured by the camera, in particular at a specific moment and in dependence on an orientation and/or setting of the camera. For this purpose, the information about the imaging window of the camera can in particular comprise its position and/or size in the region of the background display device.

The first control unit can, for example, be configured to determine, based on the information about the imaging window of the associated camera, whether the at least one section of the determined projection is imaged by the camera and can be seen in an image generated by the camera. In this case, the first control unit can be configured to transmit the at least one section in particular with as high as possible a resolution to the second control unit in order to ensure that the representation of the virtual background can be imaged by the camera in the best possible manner. If the at least one section is, in contrast, located outside the imaging window of the camera, it can, for example, be sufficient to display the section with only a reduced resolution on the background display device so that the first control unit can, for example, transmit the at least one section with a reduced resolution and can thereby transmit the corresponding image data in compressed form to the second control unit. The amount of data to be transmitted can thereby also be minimized and the control of the background display device can be accelerated.

In some embodiments, the first control unit can be configured to transmit the at least one section of the determined projection to the at least one second control unit in case the at least one section is located in the imaging window of the associated camera. Furthermore, in such embodiments, the first control unit can be configured to change the at least one section before the transmission to the at least one second control unit or can be configured not to transmit the at least one section to the at least one second control unit in case the at least one section is not located in the imaging window of the associated camera.

The first control unit can in particular be configured to transmit the at least one section to the at least one second control unit in dependence on whether the at least one panel is located in the imaging window of the associated camera, or not. In particular if the background display device has a plurality of panels and a plurality of second control units associated with a respective panel, a respective section of the determined projection can be selectively transmitted to the respective second control unit, namely in dependence on whether the respective panel or the corresponding section of the determined projection is located in the imaging window of the associated camera, or not. This is explained in more detail below.

Provision can thus be made to transmit the at least one section unchanged and in particular with a maximum resolution to the at least one second control unit only in case the at least one section is also imaged by the associated camera. If the at least one section of the representation of the virtual background and/or a respective panel at which the section is displayed is/are, in contrast, not located in the imaging window of the associated camera, the image data corresponding to the section can, for example, be transmitted in compressed form and/or with a reduced resolution to the second control unit or the section cannot be transmitted to the second control unit. In particular in some embodiments, only the picture elements of the active illumination apparatus and/or those panels that are located in the imaging window of the camera can thus be controlled at the background display device. This in particular enables a reduction in the amount of data to be transmitted with regard to the transmission of the image data from the first control unit to the second control unit.

Furthermore, in some embodiments, the first control unit can be configured to transmit an illumination command to the at least one second control unit in case the at least one panel is not located in the imaging window of the associated camera, wherein the at least one second control unit can be configured to control the active illumination apparatus to illuminate the real subject in response to the illumination command.

In a background display device formed with a plurality of panels and a plurality of second control units associated with a respective panel, the first control unit can in particular be configured to transmit such an illumination command to at least one of the plurality of second control units in case the respective panel is not located in the imaging window of the associated camera. Accordingly, that one of the plurality of second control units that receives an illumination command can be configured to control the picture elements of the respective panel to execute the illumination command.

As already explained, in addition to displaying the representation of the virtual background, the background display device can also be configured to illuminate the real subject and/or to support other illumination of the virtual image recording studio. Due to the transmission of an illumination command, it can therefore, for example, be achieved that sections of the representation of the virtual background and/or panels located outside the imaging window of the camera can continue to be used to illuminate the real subject, but that the total image data of the respective associated section of the representation of the virtual background or of the projection do not have to be transmitted. The control of the background display device can hereby also be accelerated and the amount of data to be transmitted can be reduced.

In some embodiments, the first control unit can be configured to transmit the at least one section in compressed form, in particular with a reduced resolution, to the at least one second control unit in case the at least one panel and/or the at least one section is/are not located in the imaging window of the associated camera.

The first control unit can in particular be configured to transmit the at least one section with a reduced spatial resolution to the at least one second control unit in case the at least one section is not located in the imaging window of the associated camera. In this regard, the first control unit can, for example, also be configured to transmit, instead of a specific illumination command, the at least one section in compressed form to the second control unit if this section is not imaged in a subsequent image of the representation of the virtual background by the camera and only serves to illuminate the real subject.

On a display the at least one section with a reduced resolution, light with a similar brightness and/or color distribution as on a display of the section with a maximum resolution can in particular also be generated at the corresponding panel so that the illumination of the real subject does not have to change noticeably due to the merely compressed transmission of the at least one section. Thus, street lighting that was previously still visible in an image of the camera and that can be encompassed by the virtual background can, for example, no longer be directly imaged in a subsequent image, wherein the blurred, but not completely prevented display of the street lighting at the panel that is no longer located in the imaging window of the camera can make it possible for the real subject to also still be illuminated in the subsequent image such as would be expected from the arrangement of the previously imaged street lights. This can in particular be relevant in the case of moving image recordings. Due to such a less high-resolution and/or blurred display of sections of the representation of the virtual background that are located outside an imaging window of the camera, a realistic or expected illumination of the real subject can therefore be achieved, wherein the data can, however, be transmitted in compressed form from the first control unit to the second control unit and the control of the background display device can thereby be accelerated.

The first control unit can in particular be configured to generate virtual backgrounds that change in time and/or to determine time-variable projections of the virtual background onto the active illumination apparatus and to forward them to the second control unit. This can, for example, make it possible to display movements in the virtual background by the background display device.

Furthermore, the first control unit can be configured to consider an imaging window of the camera in real time when transmitting the at least one section to the second control unit so that, for example, an imaging window that changes in location as a result of a camera pan can be considered in real time in order not to transmit a section that is no longer located in the imaging window of the camera in a subsequent image to the at least one second control unit or to only transmit said section in a modified form.

In some embodiments, the first control unit can be connected to a memory in which a model of the virtual background is stored. The first control unit can be configured to generate the virtual background based on the model.

The first control unit can, for example, be configured as a 3D computer and/or comprise a corresponding module to be able to generate a three-dimensional virtual background based on a model. For example, the first control unit can make use of a game engine for this purpose in order—similarly to as in a computer game in dependence on a position of the player—to generate a respective virtual background, in particular in three dimensions, in dependence on a position of the camera in the virtual image recording studio. For this purpose, the first control unit can, for example, access one or more databases that can be stored in the memory and that can, for example, include a respective model of the virtual background in dependence on a position of the camera. The memory can, for example, be configured as a semi-conductor memory.

In some embodiments, the first control unit can furthermore have a read-in device that is configured to read in the virtual background or a part of the virtual background as an external file. For example, such a read-in device can be configured as a DVD player to be able to read in a moving image sequence stored on a DVD and to use it as the virtual background. However, the read-in device can also be formed by other connections to be able to transmit external data to the first control unit on the basis of which the first control unit can generate the virtual background. Serial data ports, for example USB (Universal Serial Bus) ports, can in particular be considered for this purpose.

In some embodiments, the at least one second control unit can be configured to control at least a portion of the plurality of picture elements individually and/or in groups of adjacent picture elements.

For example, the at least one control unit can be configured to directly control at least a portion of the plurality of picture elements in order, for instance, to control a color and/or a brightness of the respective picture element. However, provision can also be made that a respective third control unit, which can be directly controlled by the at least one second control unit, is associated with a group of picture elements to directly control the respective associated picture elements in dependence on commands and/or information transmitted by the second control unit. The respective third control unit can be formed separately from the first control unit and the second control unit(s), i.e. as a separate physical unit.

In some embodiments, the control device can comprise a plurality of third control units and the picture elements can be divided into a plurality of groups of picture elements, wherein each of the plurality of groups can be associated with a respective third control unit. The at least one second control unit can be configured to control each picture element of a group individually or to control the group of picture elements via the respective associated third control unit.

For example, the picture elements can be formed by light-emitting diodes and the plurality of third control units can be configured as LED drivers and/or as driver chips. Provision can further be made that a respective second control unit, which can form a panel control, is associated with the at least one panel or each of a plurality of panels which the background display device comprises. The second control unit associated with a respective panel can communicate with a plurality of third control units via which the picture elements arranged at the panel can be controllable. In this regard, the first control unit can so-to-say form a central controller for the entire background display device in order to generate the virtual background and to project it onto the background display device or the active illumination apparatus, wherein the at least one second control unit and/or a plurality of second control units can be configured to control a respective region of the background display device and in particular a respective panel of the background display device. Therefore, a respective section of the representation of the virtual background and in particular a respective section of the projection generated by the first control unit can, for example, be transmitted to the respective second control units, wherein the second control units can thereupon control the associated third control units of a panel to display the section of the representation of the virtual background.

In some embodiments, the active illumination apparatus can comprise a plurality of panels, wherein each of the plurality of panels can be associated with a respective second control unit. The first control unit can be configured to transmit a respective section of the determined projection to each of the plurality of second control units and the plurality of second control units can be configured to control the picture elements of the associated panel to display the respective section of the determined projection of the virtual background. The active illumination apparatus can thus in particular be assembled by a plurality of panels.

In some embodiments, the plurality of second control units can be configured to transmit respective information about a geometry and/or an arrangement of the associated panel to the first control unit, and the first control unit can be configured to adapt the respective section in dependence on the information. As already explained, the first control unit can, for example, be configured to adapt the respective section in dependence on dimensions of the associated panel and/or its arrangement in space so that in particular sections disposed above one another in the determined projection of the virtual background can also be transmitted to second control units of panels arranged above one another. Due to such an information transmission, the first control unit can in particular be flexibly used with differently configured or adaptable active illumination apparatus. For example, a division of the determined projection among the plurality of panels that is adapted to the specific configuration of the active illumination apparatus, in particular with respect to a number and an arrangement of the panels, can take place. For this purpose, the plurality of second control units can further in particular be linked to the first control unit via a network.

Furthermore, in some embodiments, the first control unit can be configured to transmit the respective sections with a common time stamp to the plurality of second control units, wherein the plurality of second control units can be configured to control the picture elements of the plurality of panels to display the respective sections at a point in time defined by the time stamp.

In the case of a representation of the virtual background by a plurality of panels with which a respective second control unit is associated, a respective section of the projection of the virtual background can be transmitted from the first control unit to each of the plurality of second control units. In this regard, the first control unit can distribute the projection to the different panels so that the entire representation of the virtual background can ultimately be jointly displayed at the panels. To achieve that the representation is displayed and/or changed on the entire background display device at a common point in time, a time stamp can furthermore be transmitted together with the respective image data of the respective section of the projection to be able to synchronize the display of the respective sections of the representation at the plurality of panels. As already explained, a PTP (Precision Time Protocol) can in particular be used for this purpose, wherein, to transmit both the image data of the projection from the first control unit to the plurality of second control units and such a time stamp, the Ethernet connection already mentioned can in particular be provided between the first control unit and the plurality of second control units. The plurality of second control units can furthermore be linked to the first control unit via a network to enable the execution of such a protocol.

In some embodiments, the plurality of second control units can be configured to transmit calibration data of the respective associated panel to the first control unit, wherein the first control unit can be configured to determine the projection of the virtual background in dependence on the received calibration data. Such calibration data can, for example, also be transmittable via an Ethernet connection.

For example, the calibration data can be characteristic curves of optoelectronic conversion functions (OECR), any viewing angle dependencies with regard to the representation of the virtual background, emission spectra of the picture elements of the respective panel controlled by the second control unit, a layout and/or an arrangement of the picture elements of the respective panel, or a grid of the picture elements. Furthermore, a respective inclination of the panel and/or a position of the panel can be transmittable to the first control unit via the calibration data. The first control unit can in particular be configured to take such orientations of the respective panels in space into account in the projection of the virtual background onto the active illumination apparatus.

In some embodiments, each of the plurality of panels can be formed as rectangular and without edges, wherein the plurality of panels can be arranged in a two-dimensional matrix. The plurality of panels can in particular be formed as square. Due to an edge-free design of the plurality of panels, it can in particular be achieved that the representation of the virtual background can also be continuously displayed at a transition between different panels.

The invention further relates to a recording system for a virtual image recording studio, comprising a camera and a background display device, in particular as disclosed herein, wherein the background display device is configured to display, behind a real subject, a representation of a virtual background for a recording by the camera. The background display device has an active illumination apparatus that comprises a plurality of panels having a plurality of picture elements and the camera is configured to transmit information about an imaging window to an interface of the background display device. The background display device is further configured to selectively control the panels to display the representation of the virtual background in dependence on the transmitted information about the imaging window.

The invention further relates to a background display device for a virtual image recording studio that is configured to display, behind a real subject, a representation of a virtual background for a recording by an associated camera. The background display device has an active illumination apparatus that comprises a plurality of panels having a plurality of picture elements. The background display device has an interface for receiving information about an imaging window of the associated camera. The background display device is further configured to selectively control the panels to display the representation of the virtual background in dependence on the received information about the imaging window.

In these two aspects of the invention, the explained division into a single first control unit and at least one second control unit is not absolutely necessary. However, the background display device can, for example, be configured as an LED wall that has a plurality of light-emitting diodes that form the picture elements.

In these two aspects of the invention, the background display device, as already explained above, can in particular be configured to control respective regions of the active illumination apparatus that are not located in the imaging window of the camera only to display the representation of the virtual background with a reduced spatial resolution and/or only to illuminate the real subject and/or to set them into an inactive state. The amounts of data to be transmitted to the background display device can thus in particular be limited to those data that are also actually imaged by the associated camera and/or required to illuminate the real subject. The adaptation of the representation of the virtual background or the control of the picture elements can further in particular take place in real time so that, for example, the control of the picture elements can vary in dependence on a camera movement. In some embodiments, the background display device can further be configured not to display the representation of the virtual background at panels located outside the imaging window or to display said representation of the virtual background with a reduced resolution at panels located outside the imaging window.

The invention further relates to a method of displaying a representation of a virtual background by a background display device, in particular a background display device as disclosed herein, for a recording by a camera in a virtual image recording studio. The background display device has an active illumination apparatus that comprises at least one panel having a plurality of picture elements. In this method, by a single first control unit, the virtual background is generated; a projection of the virtual background onto the active illumination apparatus is determined; and at least one section of the determined projection is transmitted to at least one second control unit. Furthermore, the active illumination apparatus is controlled by the at least one second control unit to display the at least one section of the determined projection of the virtual background.

As already explained, in such a method, a single first control unit can be used both to generate the virtual background, in particular a three-dimensional virtual background, and to project it onto the active illumination apparatus and/or at least one panel of the active illumination apparatus. Thus, an initially generated virtual background in particular does not have to be transmitted from a 3D computer to a central control of the background display device, whereupon the central control first has to process the received virtual background or the corresponding data to be able to create a projection. Rather, in this method, all the steps from generating the virtual background up to transmitting image data that represent the representation of the virtual background on the background display device can be performed by the first control unit.

The invention will be explained in the following purely by way of example with reference to embodiments and to the drawings.

Figure 2:
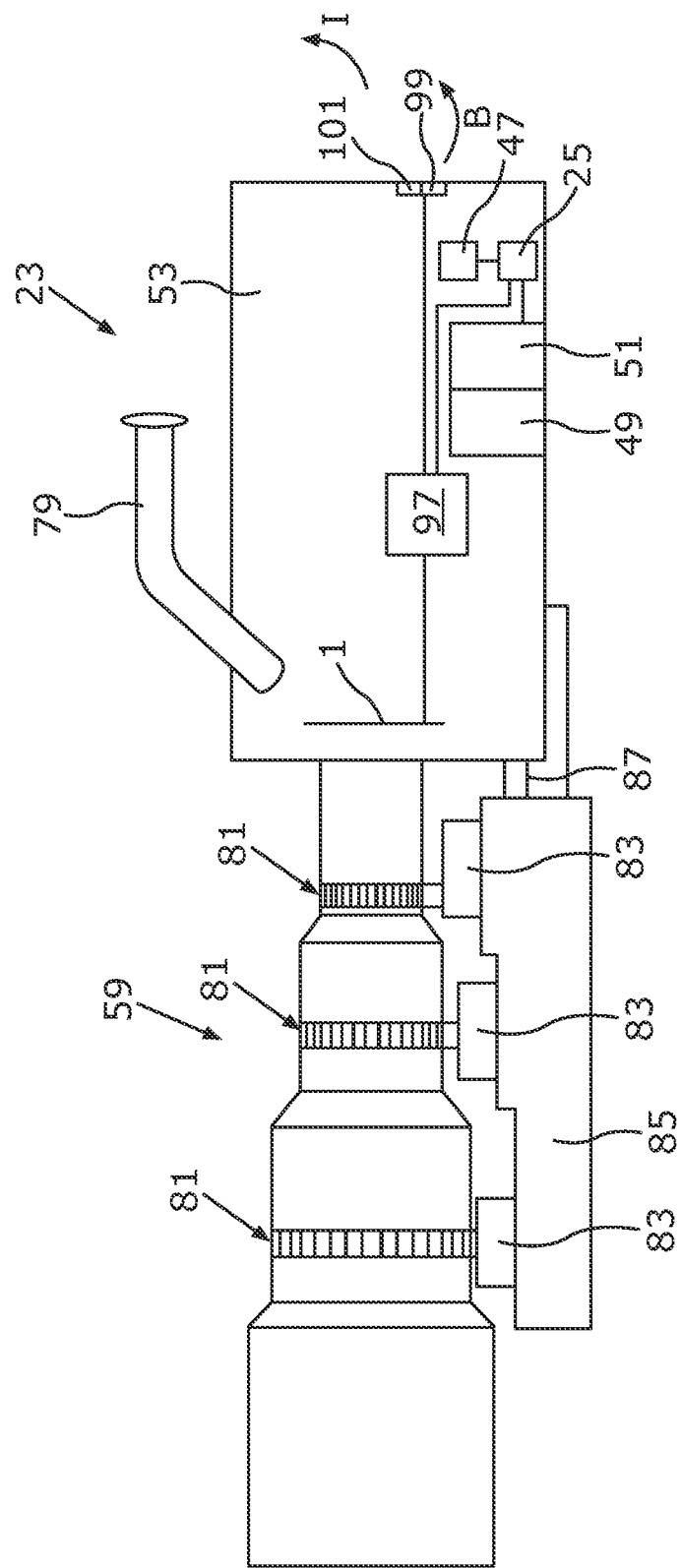
Figure 3:
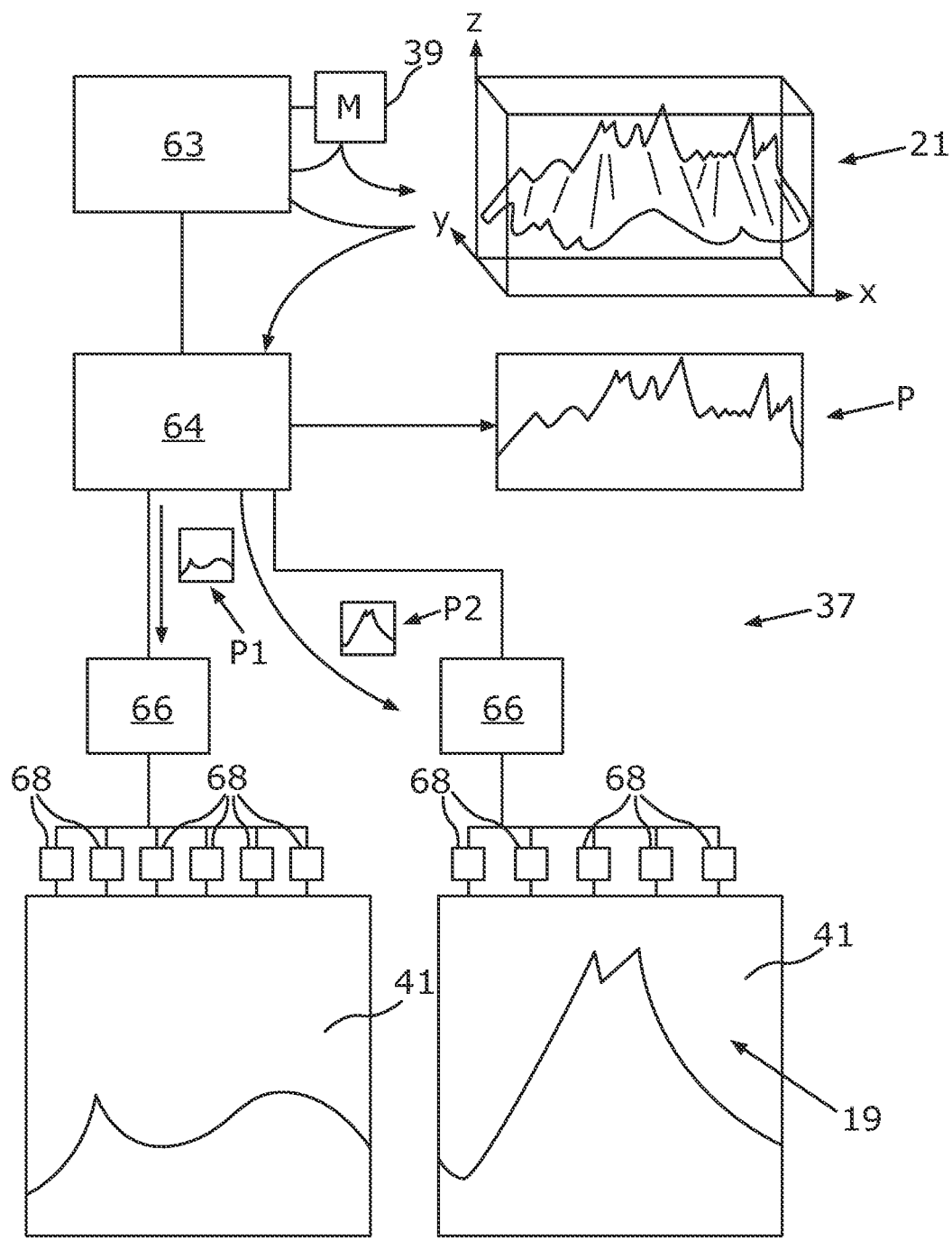
Figure 4:
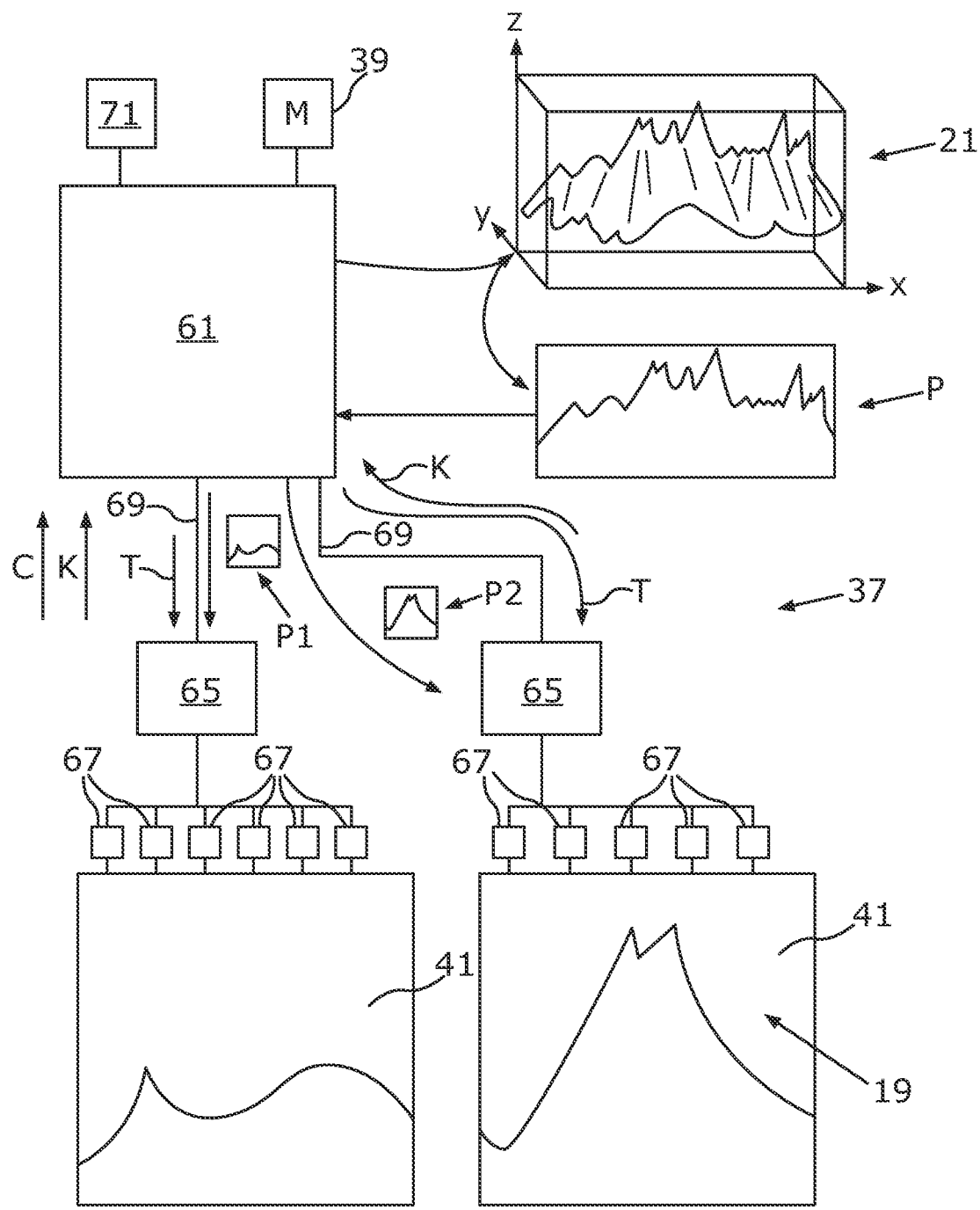
Figure 5B:
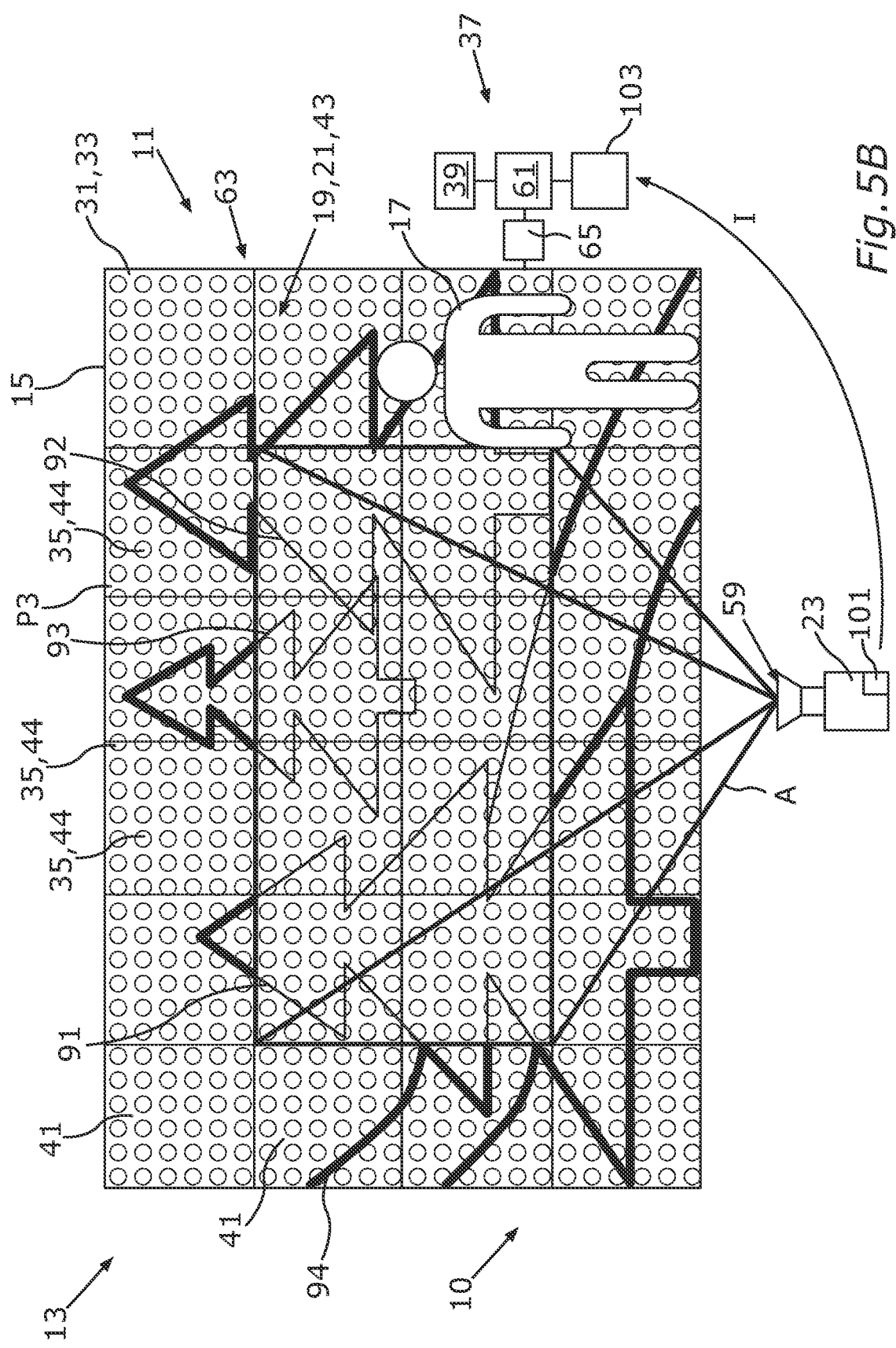
Figure 5C:
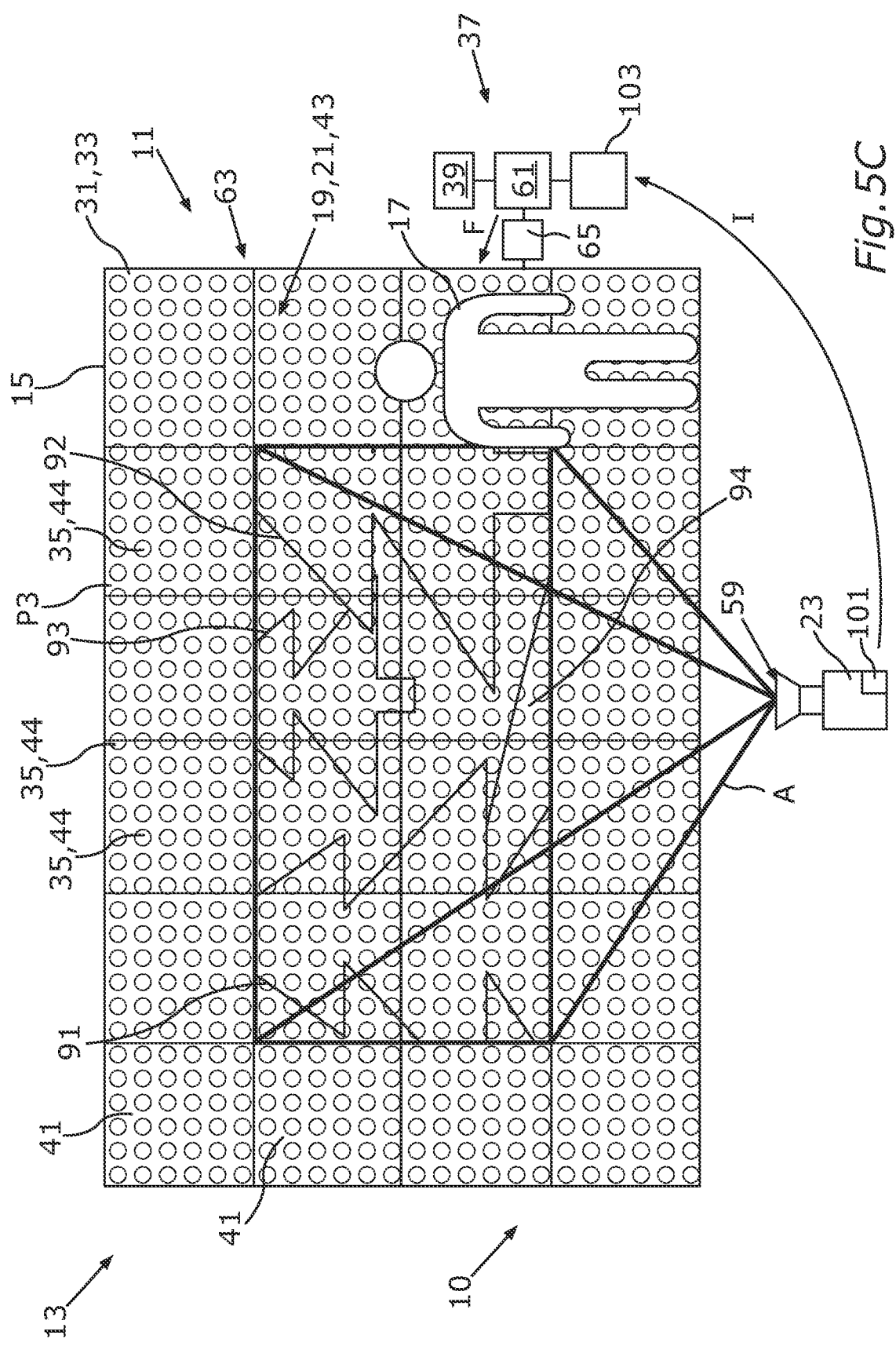

There are shown:

FIG. 1 a schematic representation of a recording system for an image recording studio with a background display device for displaying a representation of a virtual background and with a camera;

FIG. 2 a schematic representation of a camera provided for a recording in the image recording studio;

FIG. 3 a schematic illustration of a conventional control device of a background display device;

FIG. 4 a further schematic illustration of a control device of a background display device; and FIGS. 5A to 5C a respective schematic representation of the recording system for illustrating a consideration of an imaging window of the camera in the control of the background display device.

FIG. 1 schematically shows a virtual image recording studio 13, in which a scene, in particular in the form of a moving image recording and/or a photo recording, can be recorded by an associated camera 23. The camera 23 can, for example, be designed as a moving image camera in order to carry out moving images recordings that can be stored as a series of images generated by the camera 23. For this purpose, the camera 23 has a lens 59 that can in particular be designed as an interchangeable lens and that can selectively be connected to a housing of the camera 23. As a result, a respective lens 59, optimally adjusted to the environment in the image recording studio 13, can always be used in order to be able to generate the best possible recordings. An image sensor comprising a plurality of light-sensitive sensor elements can in particular be arranged in the housing of the camera 23, onto which sensor elements light, which enters via a diaphragm aperture of a diaphragm, can be guided by a lens system or at least one lens to generate an image (cf. FIG. 2).

Furthermore, a background display system 11 having a background display device 15 is arranged in the image recording studio 13 and, together with the camera 23, forms a recording system 10. The background display device 15 comprises an active illumination apparatus 31 configured as an LED wall 33 and is configured to display a representation 19 of a virtual background 21 for a recording by the camera 23. For this purpose, the illumination apparatus 31 or the LED wall 33 has a plurality of actively illuminating picture elements 35 that are arranged next to one another in a two-dimensional arrangement. For example, the picture elements 35 can be configured as individually controllable light-emitting diodes 44 or as individually controllable light-emitting diode units, wherein each of such a light-emitting diode unit can comprise a plurality of light-emitting diodes 44, in particular three light-emitting diodes 44. Provision can in particular be made that the picture elements 35 are configured as light-emitting diode units having three respective light-emitting diodes 44, wherein one of the three light-emitting diodes 44 can emit red light, one light-emitting diode 44 can emit green light and one light-emitting diode 44 can emit blue light. The light-emitting diode unit can furthermore comprise a color mixer to be able to set a respective color and/or brightness emitted by the picture element 35 by a respective individual control of the light-emitting diodes 44 of a light-emitting diode unit. The light-emitting diodes 44 can, for example, be configured as LEDs or as organic light-emitting diodes 44 or OLEDs. Background display devices for displaying a representation of a virtual background that generate the representation by a rear projection can generally also be used in the image recording studio 13.

The background display device 15 further comprises a plurality of panels 41. A respective plurality of the actively illuminating picture elements 35 are arranged at each panel 41 of the plurality of panels 41 so that a section of the representation 19 of the virtual background 21 can be displayed at each of the panels 41. The panels 41 are in particular rectangular and/or square and formed without edges so that the representation 19 of the virtual background 21 can also be displayed without visible interruptions at the transitions between panels 41. The panels 41 are further arranged in a two-dimensional matrix to form the background display device 15. In this regard, the active illumination apparatus 31 comprises a plurality of panels 41 in the embodiment shown.

The representation 19 of the virtual background 21 reflects here, for example, a three-dimensional scene 43 with objects 91, 92, 93 and 94, three trees and a path, which can be generated by appropriate control of the picture elements 35, in particular, by an appropriate setting of their respective color and brightness. The three-dimensional scene 43 is projected onto the essentially two-dimensional arrangement of the picture elements 35 of the illumination apparatus 31, wherein, in particular, the objects 91, 92 and 93 appear at a different distance to the illumination apparatus 31 or the background display device 11, in order to recreate the three-dimensionality of a real background corresponding to the virtual background 21.

In particular, the representation 19 of the virtual background 21 by way of the background display device 15, serves to generate a background for a recording of a real subject 17, for example an actor, in front of which a recording can be made or a film scene can be played. As a result, basically any kind of landscapes, spaces or environments can be created in the image recording studio 13, in front of, or, in which, a scene, for example, for a movie, is to be filmed. It is furthermore possible, by a time-variable control of the picture elements 35, to show movements in the virtual background 21, for example, a passing car, to which the actor 17 can react in an easy and improved manner compared to a scene in front of a green screen.

The background display device 15 extends here essentially in the vertical direction so that the actor 17 can move in front of the virtual background 21. However, in order to be able to depict the virtual background 21 more extensively, the background display device 15 can also extend around or above the actor 17, wherein the background display device 15 above the actor 17 can exhibit, in particular, a horizontal orientation. In order to be able to surround the actor 17 or to generate a transition from the shown vertical orientation to a horizontal orientation, the background display device 15 or the illumination apparatus 31 or the LED wall 33 can also be at least sectionally arched or curved.

In addition to representing the virtual background 21, the background display device 15 can also serve to illuminate the real subject 17 and thereby facilitate, for example, a further studio lighting for the image recording studio 13. Furthermore, by illuminating the real subject 17 by the background display device 15, the interaction of the real subject 17 or the actor 17 with light sources present in the virtual background 21, for example, lanterns or lamps, can be improved in that the real subject 17 casts a shadow which corresponds to the light conditions visible in an image generated by the camera 23.

To be able to generate the representation 19 of the virtual background 21 and to control the picture elements 35 to display the representation, the background display device 15 has a control device 37 that is connected to a memory 39. A model of the virtual background 21 can in particular be stored in the memory 39 so that the control device can generate the virtual background 21 based on the model. Furthermore, the control device 37 can be configured to project the virtual background 21 onto the background display device 15 and in particular the two-dimensional arrangement of the picture elements 35.

A possible embodiment of the associated camera is schematically shown in FIG. 2. The camera 23 has a camera body 53 to which a lens 59 is fastened. The lens 59 can in particular be configured as an interchangeable lens so that selectively various configured lenses 59 can be connected to the camera body 53 and a lens 59 that is optimal for a respective recording can always be selected. The lens 59 has three lens rings 81 by which the respective parameters of the lens 59 can be set. For example, a focusing distance, a focal length, a zoom factor and/or a diaphragm aperture, in particular an aperture of an iris diaphragm, can be set or adapted by rotating a respective one of the lens rings 81. The camera 23 can in particular be configured as a motion picture camera or moving image camera to be able to consecutively generate a sequence of images 73 that can, for example, be played as a film.

To be able to adjust the lens rings 81, a lens ring drive unit 85 is connected to the camera body 53 via a holding rod 87 and comprises a respective lens setting motor 83 for each of the lens rings 81. The lens rings 81 can be rotated by these lens setting motors 83 and adjustments to the lens 59 can be made as a result. In particular, the lens ring drive unit 85 can be actuated remotely so that said lens parameters can be set or changed remotely.

At the camera body 53, a further display device 49 is arranged via which information about settings of the camera 23 can be displayed to a user. The display device 49 can in particular be a display. The camera 23 furthermore has an input device 51 which is arranged at the camera body 53 and via which the user can make settings of the camera 23. An exposure time of the camera 23 can in particular be settable at the input device 51, wherein a control device 25 connected to the input device 51 can be configured to control the camera 23 in accordance with the input exposure time. The display device 49 and the input device 51 can in particular be formed by a touch screen via which both information can be displayed to the user and user inputs can be received.

In order to generate an image of incident light through the lens 59, the camera 23 further comprises an image sensor 1 arranged within the camera body 53. This image sensor 1 can be configured based on, for example, CMOS technology or CCD technology and comprise a plurality of light-sensitive sensor elements that can be arranged in a plurality of rows and columns. Furthermore, the camera 23 has a readout circuit 97 that is configured to read out, process and digitize the signals of the respective sensor elements and to output them to or via a signal output 99. For this purpose, the readout circuit 97 can in particular comprise amplifiers, multiplexers, analog-digital converters, buffer memories and/or microcontrollers. Ultimately, an image data set B can thus be generated by the camera 23, which corresponds to the image or an image of a field of view of the camera 23, and the image data set B can be output via the signal output 99. In order to check the field of view of the camera 23 and to be able to align the camera 23 onto a respective image section, a viewfinder 79, through which a cameraman can look through, is also arranged on the camera body 53. Furthermore, the control device 25 is connected to a memory 47 and can, for example, be configured to selectively write the image data set B into the memory 47 or to output it via the signal output 99.

The background display device 15 further has an interface 103 and the camera 23 has an interface 101 via which information I can in particular be transmittable from the camera 23 to the background display device 15. The control device 37 of the background display device 15 can in particular be configured to control the active illumination apparatus 31 in dependence on information I received from the camera 23, as explained in more detail below.

FIG. 3 shows a schematic illustration of a conventional control device 37 of such a background display device 15. In such a control device 37, a 3D computer 63 is usually provided that is connected to the memory 39. A model M of the virtual background 21 can, for example, be stored in the memory 39 and the 3D computer can be configured to generate the virtual background 21 based on the model M. For example, the virtual background 21 shown in FIG. 3 is formed by a three-dimensional mountainous landscape so that the 3D computer 63 can generate a virtual background 21 defined in a three-dimensional coordinate system x, y and z.

Thereupon, in the control device 37 illustrated by means of FIG. 3, provision is made that the 3D computer 63 transmits the generated virtual background 21 to a central control 64 of the background display device 15. The central control 64 can in particular be configured to receive the virtual background 21 or data representing the virtual background 21 from the 3D computer 63, to read out and to process the data, in order to determine a projection P of the virtual background 21 onto the active illumination apparatus 31 on the basis of the received virtual background 21. The central control 64 can thus in particular determine image data that represent the projection P of the virtual background 21 onto the active illumination apparatus 31.

As already explained, the background display device 15 can in particular comprise a plurality of panels 41 at which a respective plurality of picture elements 35, which can in particular be configured as light-emitting diodes 44, are arranged in a two-dimensional arrangement. The control device 37 illustrated by means of FIG. 3 comprises, for each of these panels 41, a respective panel control 66 that can also be referred to as a panel controller. The central control 64 of the background display device 15 can be configured to determine respective sections P1 and P2 of the projection P of the virtual background 21 to be displayed at individual panels 41 and to transmit them to the respective panel controls 66 of the panels 41. The panel controls 66 can again be connected to respective picture element drivers 68, wherein each of the picture element drivers 68 can be configured to control a respective picture element 35 or a group of picture elements 35 of the associated panel 41. Via the picture element drivers 68, respective image information, for example a brightness and/or a color, of a pixel of the projection P to be displayed by a respective picture element 35 can, for example, be transmitted to the picture elements 35 to be able to control the picture elements 35 of a panel to display the respective section P1 or P2 of the projection P. Due to the joining together of the individual panels, the entire representation 19 of the virtual background 21 can thereby ultimately be displayed on the background display device 15.

However, the control of a background display device 15 by such a control device 37 can be undesirably complicated in that, for example, the virtual background 21 generated by the 3D computer 63 first has to be assembled to form a data set and transmitted to the central control 64 that then, for example, first has to decode the received data to be able to determine the projection P. Furthermore, the 3D computer 63 operates in a fundamentally detached manner from the further components of the control device 37, which can result in an overall confusing data transmission starting from the generation of the virtual background 21 up to the display of the representation 19 of the virtual background 21 on the background display device 15. Any errors in the representation 19 of the virtual background 21 can therefore be difficult to trace and correspondingly difficult to correct.

To counter these problems, a control device 37 illustrated by means of FIG. 4 can be provided for a background display device 15. This control device 37 has a single first control unit 61 that is connected to the memory 39. Furthermore, the first control unit 61 is configured both to generate the virtual background 21, in particular based on the model M, and to determine the projection P of the virtual background 21 onto the active illumination apparatus 31 of the background display device 15. Furthermore, the first control unit 61 is configured to transmit the sections P1 and P2 to respective second control units 65 that are associated with the panels 41 at which the sections P1 and P2 of the projection P of the virtual background 21 onto the active illumination apparatus 31 are to be displayed. In this regard, the second control units 65 can in particular represent panel controls or panel controllers that are, however, also configured to perform the function of the 3D computer 63 for generating the virtual background 21.

Since the control device 37 has a single first control unit 61, the first control unit 61 can in particular form a single closed unit. The first control unit 61 can generally be formed by a single hardware component and/or by a plurality of hardware components housed in a single common housing. For example, the first control unit can comprise one or more microcontrollers and/or one or more CPUs (central processing units), wherein these microcontrollers and/or CPUs can, however, be housed by a common housing.

A control device 37 configured in this manner thus makes it possible to combine, in the single first control unit 61, the functions of generating the virtual background 21 and projecting the virtual background 21 onto the active illumination apparatus 31 of the background display device 15. In this regard, the virtual background 21 does not have to be transmitted from a 3D computer 63 to a central control 64 of the background display device 15 (FIG. 3) that first has to process the virtual background 21 or the data representing it in order then to be able to determine the projection P. By combining these process steps into the single first control unit 61 (FIG. 4), the required data transmissions can in particular be minimized, which can enable a faster and simpler control of the background display device 15. Furthermore, the generation of the virtual background 21 and the determination of the projection P of the virtual background 21 onto the active illumination apparatus 31 can be precisely coordinated with one another by performing the necessary computing steps in a single first control unit 61 so that possibly occurring errors in the representation 19 of the virtual background 21 can also be more easily traced. The concentration of the functions of generating the virtual background 21 and determining the projection P into the single first control unit 61 also makes it possible to relocate these computationally intensive functions to an external data center and to make use of its capacities. For this purpose, the second control units 65 can in particular be linked to the first control unit 61 via a network.

The second control units 65 and the first control unit 61 can generally be linked to one another (in a wired or wireless manner) via a network. A separate router (not shown in FIG. 4), which is directly or indirectly connected to the second control units 65 and the first control unit 61, can be provided for such a network. The first control unit 61 can be configured to recognize the presence of the respective second control unit 65 to enable an automatic basic configuration of the system from the plurality of panels 41 with the second control units 65. For example, the recognition of the second control units 65 in the network can take place based on individual addresses of the second control units 65 within the network.

In addition to just the determination of a projection P onto the active illumination apparatus 31 of the background display device 15, the first control unit 61 can also be configured to scale the projection P onto the active illumination apparatus 31 and/or the background display device 15. For example, corresponding length and/or size ratios can be stored in the model 39 and correspondingly in the virtual background 21 of the real landscape generated by the first control unit 61 so that they can also still be included in the projection P. To enable a display of the representation 19 of the virtual background 21 on the background display device 15, the first control unit 61 can therefore scale the determined projection P to the dimensions of the background display device and/or of the active illumination apparatus 31.

The control unit 61 can further be configured to map the projection P of the virtual background 21 onto a color space of the active illumination apparatus 31. Overall, the first control unit 61 can thus be configured to generate the virtual background 21 and, in particular in the course of determining the projection P, to process it such that a display of the representation 19 of the virtual background 21 and of the background display device 15 can directly take place. Accordingly, the first control unit 61 can also be configured to divide the projection among the plurality of panels 41 by determining and transmitting respective sections P1 and P2.

The second control units 65 can furthermore be configured to transmit information C about an arrangement and/or a geometry of the respective associated panel 41 to the first control unit 61. The first control unit 61 can be configured to adapt the section P1 or P2 to be transmitted to the respective second control unit 65 in dependence on this information C. The manner in which the individual panels 41 are arranged relative to one another can in particular be communicated to the first control unit 61 via the information C so that the sections P1 and P2 of the projection P can be correctly transmitted to the second control units 65 of the panels 41 arranged next to one another. Furthermore, due to a transmission of such information C, the first control unit 61 can be flexibly used with various active illumination apparatus 31 in that, for example, a current number and/or a current arrangement of the panels 41 onto which the virtual background 21 is to be projected can be considered by the first control unit 61. The projection P of the virtual background 21 can thereby be accordingly determined by the first control unit 61 and distributed to the panels 41. This in particular also enables a cloud-based control of the background display device 15.

As an alternative to generating the virtual background 21 based on a model M, provision can also be made that the first control unit 61 receives a virtual background 21 via a read-in device 71. For example, the read-in device 71 can be configured as a DVD player so that the first control unit 61 can, for example, receive a moving image sequence as the virtual background 21 and can project it onto the active illumination apparatus 31 to enable a display of a representation 19 of the virtual background 21 on the background display device 15.

To be able to transmit the sections P1 and P2 to the second control units 65, the first control unit 61 is connected to the second control units 65 via an Ethernet connection 69. This can in particular make it possible to transmit the sections P1 and P2 or the corresponding image data in basically any format that is, for example, requested by the second control units 65. Furthermore, the first control unit 61 can be configured to transmit, in addition to the sections P1 and P2, a respective time stamp T to the second control units 65 that can correspond to a point in time or define a point in time at which the second control units 65 are to control the respective panels 41 to display the representation 19 of the virtual background 21. It can thereby be achieved that, despite the distribution of the projection P onto a plurality of panels 41, the representation 19 is simultaneously displayed at all the regions of the background display device 15.

Furthermore, the Ethernet connection 69 can be provided to enable a transmission of calibration data K from the respective control units 65 to the first control unit 61. For example, such calibration data K can comprise a respective orientation of the associated panel 41 in space, wherein the first control unit 61 can in particular be configured to consider such calibration data K when determining the projection P of the virtual background 21 onto the active illumination apparatus 31. Alternatively or additionally, the calibration data K can, for example, comprise information about a color space of the picture elements 35 of the respective panel 41.

The second control units 65 are further connected to a plurality of third control units 67 that can be provided to directly control respective associated picture elements 35. In this regard, the third control units 67 can in particular be configured as LED drivers or driver chips in order, for example, to be able to control a group of associated picture elements 35 or light-emitting diodes 44 and in particular a respective one of the light-emitting diode units already mentioned. In this regard, the second control units 65 can, for example, transmit respective image information and/or color settings and/or brightness settings to be displayed at the picture elements 35 to the third control units 67, wherein the latter can ultimately perform the control of the picture elements 35.

As already explained, the camera 23 further has an interface 101 to be able to transmit information I to an interface 103 of the control device 37 of the background display device 15. In the embodiments illustrated by means of FIGS. 5A to 5C, the interface 103 is in particular connected to the first control unit 61 of the background display device 15 and the interfaces 101 and 103 can be configured for a wireless and/or wired communication.

As FIG. 5A illustrates, by the camera 23, a section of the background display device 15 can generally be imaged that is located in a respective imaging window A that can also be referred to as a frustum or viewing pyramid or be defined thereby. The camera 23 can in particular be configured to transmit information I about this imaging window A to the interface 103 and thus to the first control unit 61 of the control device 37 of the background display device 15, wherein the first control unit 61 can be configured to consider the imaging window A of the camera 23 when transmitting the sections P1 and P2 to the respective second control units 65.

As FIG. 5B illustrates, the first control unit 61 can, for example, be configured to transmit the respective section P1 or P2 unchanged to those panels 41 or the associated second control units 65 that are located within the imaging window A of the camera 23. In contrast, the first control unit 61 can be configured to transmit respective sections P3 of the projection P that are located outside the imaging window A of the camera 23 with a merely reduced resolution to the respective second control units 65. Accordingly, the sections P3 can also be displayed with a reduced resolution on the background display device 15 or by the active illumination apparatus 31.

Such a display with a reduced resolution can in particular make it possible to transmit the image data corresponding to sections P3 located outside the imaging window A of the camera 23 in compressed form to the respective second control units 65 that can furthermore be associated with panels 41 that are located outside the imaging window A of the camera 23. Overall, a compression and a reduction of the image data to be transmitted can thereby be achieved to enable a faster control of the background display device 15. Such a display with a reduced resolution can furthermore in particular make it possible that the real subject 17 is still illuminated by the background display device 15 and is in particular illuminated matched to the virtual background 21 in that a representation joining the part of the representation 19 of the virtual background 21 imaged by the camera 23 can also be displayed at the panels 41 located outside the imaging window A.

As FIG. 5C shows, provision can, however, also be made that the first control unit 61 is configured not to display sections P3 of the projection lying outside the imaging window A of the camera 23 on the background display device 15 or not to transmit the corresponding sections P3 to the respective second control units 65. Alternatively or additionally, the first control unit 61 can also be configured only to transmit an illumination command F to the respective second control unit 65 for sections P3 or panels 41 lying outside the imaging window A of the camera 23, wherein the second control unit 65 can be configured to control the respective panel 41 to illuminate the real subject 17 in response to the illumination command F. The amount of data to be transmitted can hereby also be compressed by not transmitting sections P3 lying outside the imaging window A as detailed image data, but by transmitting only an illumination command F or no data.

REFERENCE NUMERAL LIST

1 image sensor
10 recording system
11 background display system
13 image recording studio
15 background display device
17 real subject, actor
19 representation
21 virtual background
23 camera
31 illumination apparatus
33 LED wall
35 picture element
37 control device
39 memory
41 panel
43 three-dimensional scene
35 light-emitting diode
47 memory
49 display device
51 input device
53 camera body
59 camera lens, interchangeable lens
61 first control unit
63 3D computer
64 central control
65 second control unit
66 panel control
67 third control unit
68 picture element driver
69 Ethernet connection
71 read-in device
79 viewfinder
81 lens ring
83 lens setting motor
85 lens ring drive unit
87 holding rod
91 first object
92 second object
93 third object
94 fourth object
97 readout circuit
99 signal output
101 interface
103 interface
A imaging window
B image data set
C information F illumination command
I information
K calibration data
M model
P projection
P1 section of the projection
P2 section of the projection
P3 section of the projection
T time stamp
x coordinate
y coordinate
z coordinate

The invention claimed is:

1. A background display device for a virtual image recording studio that is configured to display, behind a real subject, a representation of a virtual background for a recording by an associated camera,
wherein the background display device has an active illumination apparatus that comprises at least one panel having a plurality of picture elements in an at least two-dimensional arrangement, and wherein the background display device has a control device,
wherein the control device comprises a single first control unit and least one second control unit,
wherein the first control unit is configured
to generate the virtual background,
to determine a projection of the virtual background onto the active illumination apparatus, and
to transmit at least one section of the determined projection to the at least one second control unit,
wherein the at least one second control unit is configured to control the active illumination apparatus to display the at least one section of the determined projection of the virtual background,
wherein the at least one second control unit is configured to transmit information about an arrangement of the at least one panel to the first control unit, wherein the first control unit is configured to adapt the at least one section of the determined projection of the virtual background in dependence on the information.

2. A background display device in accordance with claim 1, wherein the background display device is configured as an LED wall that has a plurality of light-emitting diodes that form the picture elements.

3. A background display device in accordance with claim 1, wherein the first control unit is configured to scale the virtual background to the active illumination apparatus.

4. A background display device in accordance with claim 1, wherein the at least one second control unit is configured to transmit information about a geometry of the at least one panel to the first control unit, wherein the first control unit is configured to adapt the at least one section of the determined projection of the virtual background in dependence on the information.

5. A background display device in accordance with claim 1, wherein the first control unit is configured to map the virtual background onto a color space of the active illumination apparatus.

6. A background display device in accordance with claim 1, wherein the first control unit is configured to communicate with the at least one second control unit via an Ethernet connection.

7. A background display device in accordance with claim 1, wherein the background display device has an interface for receiving information about an imaging window of the associated camera, wherein the first control unit is configured to determine the at least one section of the determined projection and transmit said at least one section of the determined projection to the at least one second control unit in dependence on the information about the imaging window of the camera.

8. A background display device in accordance with claim 7, wherein the first control unit is configured to transmit the at least one section of the determined projection to the at least one second control unit in case the at least one section is located in the imaging window of the associated camera, and wherein the first control unit is configured to change the at least one section before the transmission to the at least one second control unit or is configured not to transmit the at least one section to the at least one second control unit in case the at least one section is not located in the imaging window of the associated camera.

9. A background display device in accordance with claim 7, wherein the first control unit is configured to transmit an illumination command to the at least one second control unit in case the at least one panel is not located in the imaging window of the associated camera, wherein the at least one second control unit is configured to control the active illumination apparatus to illuminate the real subject in response to the illumination command.

10. A background display device in accordance with claim 7, wherein the first control unit is configured to transmit the at least one section in compressed form to the at least one second control unit in case at least one of the at least one panel or the at least one section is not located in the imaging window of the associated camera.

11. A background display device in accordance with claim 1, wherein the first control unit is connected to a memory in which a model of the virtual background is stored, and wherein the first control unit is configured to generate the virtual background based on the model; or
wherein the first control unit has a read-in device that is configured to read in the virtual background or a part of the virtual background as an external file.

12. A background display device in accordance with claim 1, wherein the at least one second control unit is configured to at least one of:
controlling at least a portion of the plurality of picture elements individually; or
controlling at least a portion of the plurality of picture elements in groups of adjacent picture elements.

13. A background display device in accordance with claim 1, wherein the control device comprises a plurality of third control units, and wherein the picture elements are divided into a plurality of groups of picture elements, wherein each of the plurality of groups is associated with a respective third control unit, wherein the at least one second control unit is configured to control each picture element of a group individually or to control the groups of picture elements via the respective associated third control unit.

14. A background display device in accordance with claim 1, wherein the active illumination apparatus comprises a plurality of panels and a plurality of second control units, wherein each of the plurality of panels is associated with a respective second control unit, wherein the first control unit is configured to transmit a respective section of the determined projection to each of the plurality of second control units, and wherein the plurality of second control units are configured to control the picture elements of the associated panel to display the respective section of the determined projection of the virtual background.

15. A background display device in accordance with claim 14, wherein the first control unit is configured to transmit the respective sections with a common time stamp to the plurality of second control units, wherein the plurality of second control units are configured to control the picture elements of the plurality of panels to display the respective sections at a point in time defined by the time stamp.

16. A background display device in accordance with claim 14, wherein the plurality of second control units are configured to transmit calibration data of the respective associated panel to the first control unit, wherein the first control unit is configured to determine the projection of the virtual background in dependence on the received calibration data.

17. A background display device in accordance with claim 14, wherein the plurality of second control units and the first control unit are linked to one another via a network, wherein the first control unit is configured to recognize the presence of a respective one of the plurality of second control units in the network.

18. A recording system for a virtual image recording studio, comprising a camera and a background display device, said background display device being configured to display, behind a real subject, a representation of a virtual background for a recording by the camera,
  wherein the background display device has an active illumination apparatus that comprises a plurality of panels having a plurality of picture elements,
  wherein the camera is configured to transmit information about an imaging window to an interface of the background display device, and wherein the background display device is configured to selectively control the panels to display the representation of the virtual background in dependence on the transmitted information about the imaging window, wherein the background display device is configured not to display the representation of the virtual background at panels located outside the imaging window.

19. A method of displaying a representation of a virtual background by a background display device for a recording by a camera in a virtual image recording studio, wherein the background display device has an active illumination apparatus that comprises at least one panel having a plurality of picture elements,
  wherein by a single first control unit:
    the virtual background is generated,
    a projection of the virtual background onto the active illumination apparatus is determined, and
    at least one section of the determined projection is transmitted to at least one second control unit; and
  wherein the active illumination apparatus is controlled by the at least one second control unit to display the at least one section of the determined projection of the virtual background,
  wherein the at least one second control unit is configured to transmit information about an arrangement of the at least one panel to the first control unit, wherein the first control unit is configured to adapt the at least one section of the determined projection of the virtual background in dependence on the information.

* * * * *